(12) United States Patent
Ando

(10) Patent No.: US 9,388,864 B2
(45) Date of Patent: Jul. 12, 2016

(54) ROLLER-TYPE ONE-WAY CLUTCH

(71) Applicant: NSK-Warner K.K., Tokyo (JP)

(72) Inventor: Tomoharu Ando, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 14/412,407

(22) PCT Filed: Nov. 22, 2013

(86) PCT No.: PCT/JP2013/006865
§ 371 (c)(1),
(2) Date: Dec. 31, 2014

(87) PCT Pub. No.: WO2014/080635
PCT Pub. Date: May 30, 2014

(65) Prior Publication Data
US 2015/0167753 A1 Jun. 18, 2015

(30) Foreign Application Priority Data
Nov. 26, 2012 (JP) .................................. 2012-257235

(51) Int. Cl.
*F16D 41/066* (2006.01)
*F16D 41/06* (2006.01)
(52) U.S. Cl.
CPC ...... *F16D 41/066* (2013.01); *F16D 2041/0605* (2013.01); *F16D 2300/12* (2013.01)
(58) Field of Classification Search
CPC ................. F16D 2041/0665; F16D 2041/0605
USPC .................................................... 192/45.019
See application file for complete search history.

(56) References Cited

U.S. PATENT DOCUMENTS 3,031,053 A * 4/1962 Sauzedde et al. ........ 192/45.008
3,917,036 A * 11/1975 Johnson et al. .......... 192/45.016
(Continued)

FOREIGN PATENT DOCUMENTS

JP 11-182588 A 7/1999
JP 2000-145829 A 5/2000
(Continued)

OTHER PUBLICATIONS

English Translation of International Preliminary Report on Patentability from International Patent Application No. PCT/JP2013/006865, Jun. 4, 2015.

*Primary Examiner* — Robert Hodge
*Assistant Examiner* — Ryan Dodd
(74) *Attorney, Agent, or Firm* — Shapiro, Gabor and Rosenberger, PLLC

(57) ABSTRACT

Provided is a roller type one-way clutch that can prevent rollers from coming off at the time of conveyance and assembling of an outer race without increasing a cost and a weight. The roller type one-way clutch includes: an outer race having pockets that have a cam surface formed on an inner surface thereof; an inner race that is apart on an inner diameter side in a radial direction from the outer race, concentrically arranged to allow its relative rotation, and has an annular outer peripheral raceway surface; a plurality of rollers each of which is arranged in each pocket, engaged with the cam surface, and transmits torque between the outer race and the inner race; and springs each of which is arranged in each pocket and energizes each roller by one end portion thereof in an engaging direction with respect to the cam surface, the other end portion of each spring is fixed to the outer race, and a support portion that supports each roller in a radial direction is provided at the other end portion.

13 Claims, 4 Drawing Sheets

(56) References Cited

U.S. PATENT DOCUMENTS

| | | | | |
|---|---|---|---|---|
| 4,368,809 A | * | 1/1983 | Husmann | 192/45.016 |
| 6,138,805 A | | 10/2000 | Kinoshita | |
| 6,374,974 B1 | | 4/2002 | Wake | |
| 8,256,594 B2 | * | 9/2012 | Doerrie et al. | 192/45.006 |
| 2010/0096234 A1 | * | 4/2010 | Liang | 192/45 |
| 2010/0096235 A1 | * | 4/2010 | Shirataki et al. | 192/45 |
| 2010/0258398 A1 | * | 10/2010 | Shirataki et al. | 192/45 |
| 2011/0088988 A1 | | 4/2011 | Sakai et al. | |
| 2012/0000741 A1 | * | 1/2012 | Altman et al. | 192/45 |
| 2015/0034442 A1 | * | 2/2015 | Baeumler | 192/45.004 |

FOREIGN PATENT DOCUMENTS

| | | |
|---|---|---|
| JP | 2003-172377 A | 6/2003 |
| JP | 2009-210096 A | 9/2009 |
| JP | 2011-085245 A | 4/2011 |

* cited by examiner

ROLLER-TYPE ONE-WAY CLUTCH

TECHNICAL FIELD

The present invention relates to a roller type one-way clutch used as a component for torque transmission or backstop in a drive apparatus of, e.g., an automobile or industrial machinery. In particular, the present invention relates to a roller type one-way clutch intended to prevent rollers from coming off at the time of conveyance and assembling of an outer race.

BACKGROUND ART

In general, a roller type one-way clutch is constituted of an outer race, an inner race concentrically arranged with the outer race, a plurality of rollers that are arranged between an outer peripheral surface of the inner race and an inner peripheral cam surface of the outer race and transmit torque, springs that are contact with idling sides of the rollers respectively, and others.

In such a configuration, the one-way clutch rotates the inner race in one direction alone with respect to the outer race by a cam mechanism constituted of the rollers and the cam surface. That is, the inner race is idled in one direction with respect to the outer race, and rotational torque is provided to the outer race in the opposite direction alone through the cam mechanism.

Generally, in the roller type one-way clutch, to obtain secure mesh, the rollers that are torque transmission members, the springs that energize them, and others are arranged in a pocket provided on the outer race.

In such a roller type one-way clutch, the outer race, the rollers, and the springs are assembled as sub-assemblies, and they are assembled to the inner race. At this time, the rollers inserted in and attached to the pocket provided at the inner periphery of the outer race come off to the inner diameter side depending on circumstances.

In Patent Literature 1, a roller type one-way clutch in which holding portions projecting to an opening side are formed at both circumferential ends of an opening portion of a pocket provided on an outer race by casting is disclosed. These holding portions are configured to prevent rollers or springs from coming off toward an inner peripheral side of the outer race.

CITATION LIST

Patent Literature

PTL 1: Japanese Patent Application Laid-Open No. 2003-172377

SUMMARY OF INVENTION

Technical Problem

However, in the roller type one-way clutch according to Patent Literature 1, since the holding portions are provided at both the ends of the pocket opening portion, a mold for these portions must be prepared anew, and there is concern that a cost may increase.

Further, since each holding portion is formed into a shape projecting from part of the outer race, a weight of the outer race increases, and a weight of the roller type one-way clutch also increases.

It is, therefore, an object of the present invention to provide a roller type one-way clutch that can prevent rollers from coming off at the time of conveyance and assembling of an outer race and stably operates without increasing a cost and a weight.

Solution to Problem

To achieve the object, a roller type one-way clutch according to the invention of the present application includes:
an outer race having pockets that have a cam surface formed on an inner surface thereof;
an inner race that is apart on an inner diameter side in a radial direction from the outer race, concentrically arranged to allow its relative rotation, and has an annular outer peripheral raceway surface;
a plurality of rollers each of which is arranged in each pocket, engaged with the cam surface, and transmits torque between the outer race and the inner race; and
springs each of which is arranged in each pocket and energizes each roller by one end portion thereof in an engaging direction with respect to the cam surface, and it is characterized in that the other end portion of each spring is fixed to the outer race and a support portion that supports each roller in a radial direction is provided at the other end portion.

Advantageous Effects of Invention

According to the roller type one-way clutch of the present invention, the following effects can be provided.

Even if the outer race, the rollers, and the springs are assembled as sub-assemblies, since the support portions of the springs support the rollers in the radial direction, the rollers inserted in and attached to the pockets provided on at the inner periphery of the outer race can be prevented from coming off toward the inner diameter side. Therefore, the ease of assembly of the roller type one-way clutch can be improved.

Since the holding portions do not have to be provided at both the ends of the pocket opening portion, a mold for these portions does not have to be prepared anew, and hence a cost can be reduced.

Since each holding portion that holds the roller do not have to be formed into a shape projecting from part of the outer race, a weight of the outer race is not increased, thereby contributing to weight saving of the roller type one-way clutch.

Since each spring is made of a strip-like material like the prior art and bent portions are partially added, an increase in cost can be suppressed.

Since each spring that energizes the roller is provided with the function of holding the roller, a holder required in the prior art is no longer necessary.

DESCRIPTION OF EMBODIMENTS

An embodiment according to the present invention will now be described hereinafter with reference to the drawings. It is to be noted that an embodiment described below only shows the present invention as an illustrative example and needless to say that other changes can be made.

Figure 1:
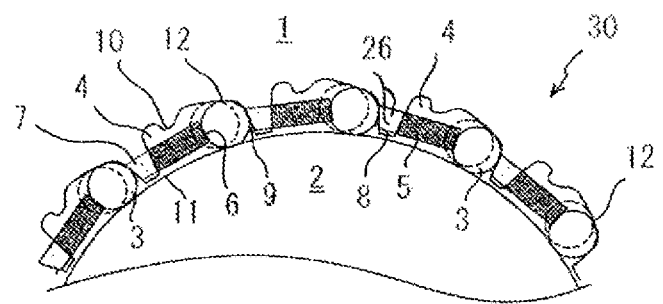
FIG. 1 is a partial front view showing a roller type one-way clutch according to an embodiment of the present invention and depicts a meshed state.
Figure 2:
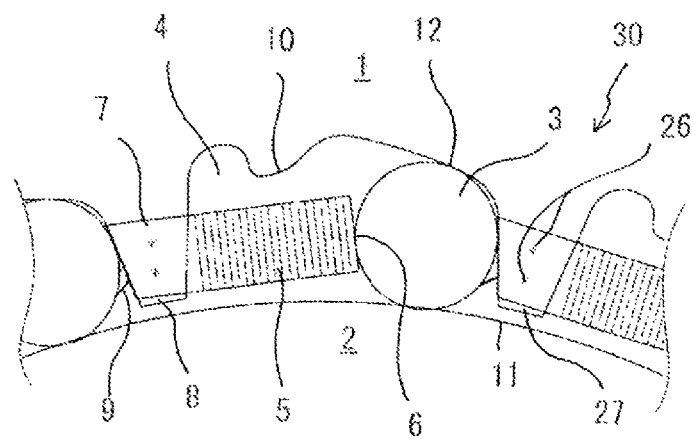
FIG. 2 is a partially enlarged view of FIG. 1.

FIG. 1 is a partial front view showing a roller type one-way clutch according to the embodiment of the present invention, and FIG. 2 is a partially enlarged view of FIG. 1.

FIG. 1 and FIG. 2 show a state that rollers are meshed with a cam surface, namely, a state that a one-way clutch is locked, i.e., a state that torque is transmitted. FIG. 1 shows that rollers 3 indicated by a broken line are placed at positions before engaging with a cam surface 12.

As shown in FIG. 1, a roller type one-way clutch 30 includes an annular outer race 1 including pockets 4 formed as concave portions each having the cam surface 12 on an inner periphery thereof, an inner race 2 that is apart from the outer race 1 on an inner diameter side in a radial direction, concentrically arranged to allow its relative rotation, and has an annular outer peripheral raceway surface 11, and a plurality of rollers 3 that are arranged in the pocket 4 and transmit torque between the outer peripheral raceway surface 11 of the inner race 2 and the cam surface 12.

The plurality of pockets 4, each of which is provided on the inner diameter side of the outer race 1, are provided at equal intervals in a circumferential direction. One roller 3 and a spring are arranged in each pocket 4. Furthermore, on an outer diameter side of each pocket 4, a protrusion 10 is provided on an upper surface on the opposite side of the cam surface 12 in the circumferential direction and limits movement of the roller 3 toward a direction of the spring, i.e., an accordion spring 5. As a result, it is possible to avoid settling of the accordion spring 5 caused when the roller 3 squashes the spring 5.

It is needless to say that the number of pockets 4 can be arbitrarily selected in accordance with a magnitude of torque.

As shown in FIG. 1, the roller type one-way clutch 30 includes the accordion springs 5 each of which is arranged in the pocket 4 and energizes the roller 3 in an engaging direction relative to the cam surface 12.

As will be described later with reference to FIG. 3, one end portion 6 of each accordion spring 5 is in contact with the roller 3 so as to engage the roller 3 between the cam surface 12 of the outer race 1 and the outer peripheral raceway surface 11 of the inner race 2, and it provides energizing force. In this state, the roller 3 also abuts on a side surface of a protrusion 8 of the outer race 1.

On the other hand, the other end portion 7 of the accordion spring 5 provided on the opposite side of the one end portion 6 is fixed to the outer race 1 as will be described later. Here, a relationship between the other end portion 7 of the accordion spring 5 and the outer race 1 will now be described with reference to FIG. 2 that is a partially enlarged view of FIG. 1.

The outer race 1 includes the protrusions 8 protruding toward the inner diameter side, i.e., the inner race 2 side. The pocket 4 is formed between the protrusions 8. Since a sufficient clearance is provided between a tip portion of each protrusion 8 on the inner diameter side and the outer peripheral raceway surface 11 of the inner race 2, the tip portion and the inner race 2 do not come into contact with each other.

Figure 3:
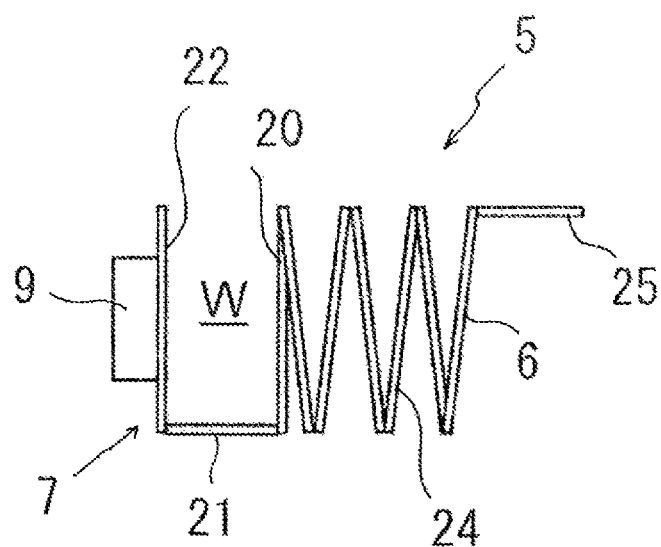
FIG. 3 is a top view of a spring for use in the roller type one-way clutch according to the embodiment of the present invention.

FIG. 3 is a top view of the accordion spring for use in the roller type one-way clutch according to the embodiment of the present invention. The accordion spring 5 is made of a strip-like sheet material having predetermined elasticity and includes a bellows portion 24 that is a main body. The bellows portion 24 integrally includes one end portion 6 that engages with a side surface of the roller 3 and provides energizing force to the roller 3 at an end portion thereof along the axial direction. Moreover, the other end portion 7 is integrally formed on the opposite side of the one end portion 6 of the bellows portion 24.

A tab portion 25 used for holding an axial end face of the roller 3 is provided at the one end portion 6 of the accordion spring 5. Therefore, each roller 3 is prevented from coming off in one direction of the axial directions.

The other end portion 7 includes a first plate 20 continuous from the bellows portion 24, a second plate 21 integral with the first plate 20, and a third plate 22 integral with the second plate 21. As can be understood from FIG. 3, a substantially rectangular space W surrounded by the first to third plates 20, 21, and 22 is formed, and the protrusion 8 of the outer race 1 is fitted in this space W.

Figure 4:
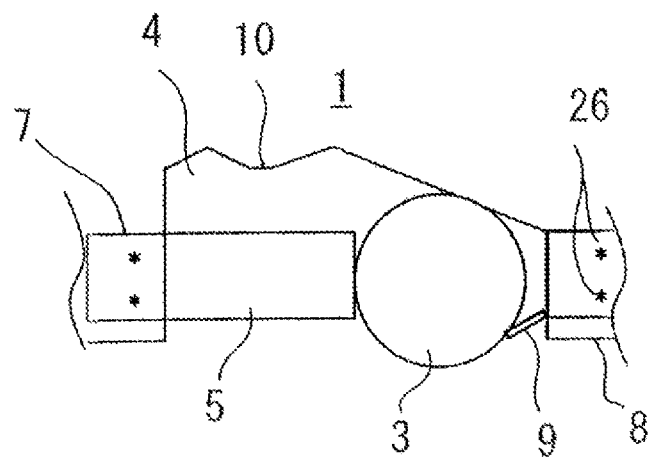
FIG. 4 is a schematic view of the roller type one-way clutch according to the embodiment of the present invention.

A support portion 9 extending from the third plate 22 in the axial direction is integrally formed on a lower portion of the third plate 22. As shown in FIG. 4, the support portion 9 is formed so as to be bent downward from a lower end of the third plate 22 and supports the roller 3 in the radial direction. The support portion 9 is formed while folding at an existing part without providing a new part to the accordion spring 5.

Figure 5:
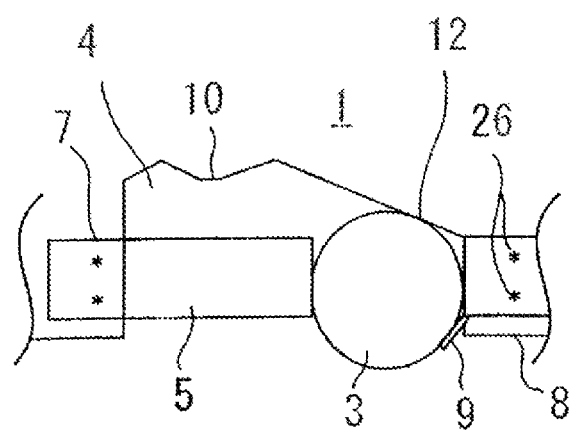
FIG. 5 is a schematic view of the roller type one-way clutch according to the embodiment of the present invention. It shows a state that the roller type one-way clutch is locked from a state depicted in FIG. 4.

FIG. 4 is schematic view of the roller type one-way clutch according to the embodiment of the present invention. Further, FIG. 5 is a schematic view of the roller type one-way clutch according to the embodiment of the present invention. There is shown a state that the roller type one-way clutch is locked from the state depicted in FIG. 4. The roller 3, the spring 5, and others that are originally arranged in the circumferential direction as shown in FIG. 1 or FIG. 2 are arranged on a straight line for convenience's sake. In FIG. 4 and FIG. 5, illustration of the inner race 2 is omitted.

FIG. 4 shows the roller type one-way clutch 30 in a sub-assembly state that the accordion spring 5 and the roller 3 are assembled to the outer race 1. The accordion spring 5 is fitted to the protrusion 8 of the outer race 1 at the other end portion 7. In this state, the support portion 9 provided at the other end portion 7 of the accordion spring 5 supports the lower portion of the roller 3 and prevents the roller 3 from coming off toward the inner diameter side. The roller 3 is held by energizing force of the accordion spring 5 in a state that it is appressed against the support portion 9.

Figure 7:
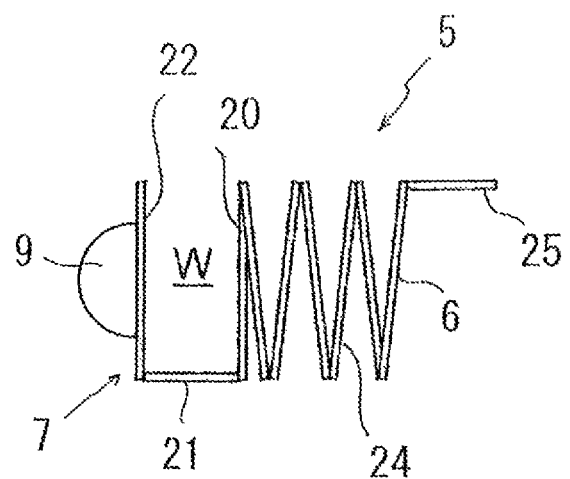
FIG. 7 is a top view of a spring for use in a roller type one-way clutch showing another conformation of a support portion.
Figure 8:
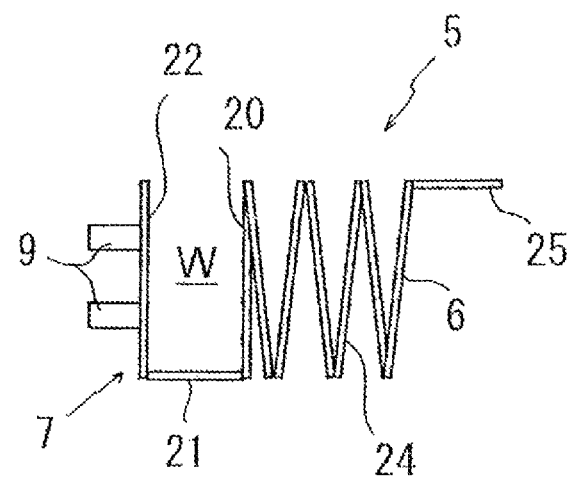
FIG. 8 is a top view of a spring for use in a roller type one-way clutch showing still another conformation of the support portion.

Although the support portion 9 shown in FIG. 3 has a substantially rectangular shape, it may have any other shape as long as it can prevent the roller 3 from coming off in the inner diameter direction by coming into contact with the roller 3. For example, it is possible to adopt a semicircular support portion 9 shown in FIG. 7 or a support portion 9 divided into two segments shown in FIG. 8. The two or more segments can be provided.

Additionally, the accordion spring 5 is fixed to an axial end face of the protrusion 8 of the outer race 1 at the other end portion 7. The other end portion 7 of the accordion spring 5 is fixed to an axial end face 27 of the outer race 1 by, e.g., welding, spot welding, bonding, soldering, or the like. Any other securing method can be also used.

Since the accordion spring 5 is fixed on the axial end face 27 of the protrusion 8 of the outer race 1, a fluctuation in relative position of the accordion spring 5 and the outer race 1 is substantially eliminated. Therefore, it is possible to avoid abrasion or breakage due to friction with an outer race inner diameter portion or the inner race raceway surface.

Further, movement of the accordion spring 5 during an operation is not affected by the outer race 1, and the stable smooth movement can be provided. As a result, meshing properties of the rollers can be improved.

In FIG. 4 and FIG. 5, the other end portion 7 of the accordion spring 5 is fixed by welding, for example. Therefore, welded portions 26 are present at two positions on a surface of the other end portion 7. At this time, a non-illustrated notch can be provided in the axial end face of the protrusion 8 of the outer race 1. When the notch is provided, backlash of the accordion spring 5 in the radial direction can be avoided. Furthermore, positions at which the other end portion 7 is fixed to the outer race 1 may be other than two positions. For example, this portion may be fixed at one position or a plurality of positions that are greater than or equal to two.

When a non-illustrated side plate is provided, a gap can be prevented from being produced between the side plate and the outer race. That is because a protrusion that is several tenths of one millimeter is generated on each welded portion 26 by welding and disposing the side plate results in production of the gap between the side plate and the outer race 1 due to this protrusion. It is good enough to form the notch into a size that allows the second plate 21 at the other end portion 7 of the accordion spring 5 to be fitted.

When the side plate is provided, since the side plate and the outer race 1 come into contact with each other without generating a gap, the roller 3 can be prevented from coming off along the axial direction, and the accordion spring 5 can be also prevented from coming off. Moreover, positioning of the accordion spring 5 relative to the outer race 1 can be stabilized. In this case, welding the accordion spring 5 to the outer race 1 can be omitted.

Here, a state of the support portion 9 will now be described. Referring to FIG. 4, in the outer race 1, the according spring 5, and the roller 3 that are in the sub-assembly state before assembling to the inner race 2, the support portion 9 supports the lower portion of the roller 3. When this sub-assembly is assembled to the inner race 2, the roller 3 is supported on the outer peripheral raceway surface 11 of the inner race 2.

After assembling to the inner race 2, when large torque is input like a locked state, the support portion 9 is sandwiched and crushed between the roller 3 and the outer race 1. Even in this case, the support portion 9 scrapes the roller 3 and supports the roller 3, but it does not affect a function of the roller 3. The one end portion 6 of the accordion spring 5 and the support portion 9 fulfill a function like a holder relative to the roller 3.

The support portion 9 is a portion added to the accordion spring 5 as a function of preventing the roller 3 from coming off, does not have high strength, has a function of preventing the roller 3 from coming off at the time of assembling, and does not function during a one-way clutch operation. Additionally, even when the roller 3 collides with the support portion 9 during the operation, since the support portion 9 easily deforms downward along the radial direction as shown in FIG. 5, the function of the roller type one-way clutch 30 is not obstructed at all.

Figure 6:
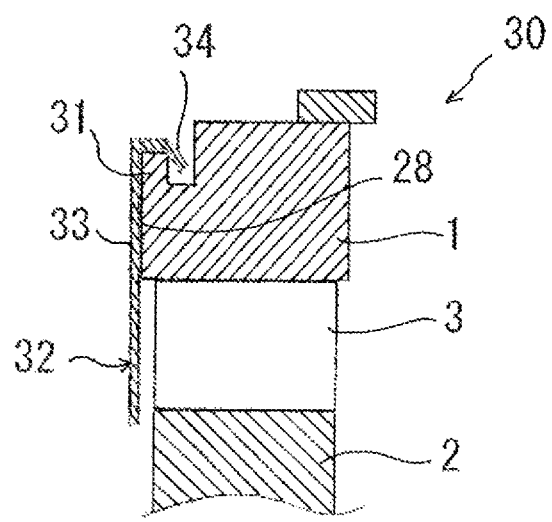
FIG. 6 is a partial cross-sectional view of a roller type one-way clutch in an axial direction showing another embodiment of the present invention.

FIG. 6 is a partial cross-sectional view of a roller type one-way clutch in the axial direction showing another embodiment of the present invention. In this embodiment, an annular retainer having a hole pierced at the center along the axial direction is used as a retainer for the roller 3 in the axial direction. A retainer 32 includes a plate portion 33 that is an annular and flat plate member and an annular flange portion 34 that is bent from an outer edge of the plate portion 33.

The retainer 32 is disposed to an axial end face 28 side of an outer race 1 having an accordion spring 5 fixed thereto. The retainer 32 is fixed to the outer race 1 by caulking or snap-fastening the flange portion 34 with respect to a protrusion 31 provided at an outer peripheral edge of the axial end face 28. As obvious from FIG. 6, a predetermined clearance is provided with respect to the axial end face of the roller 3. Furthermore, a predetermined clearance is also provided to a fixing portion of the accordion spring 5 (not illustrated in FIG. 6).

When the retainer 32 is provided in place of the side plate, a simple structure can be used to prevent the roller 3 from coming off in the axial direction without increasing a cost. Moreover, in the embodiment shown in FIG. 6, the roller 3 is prevented from coming off in the inner diameter direction by the support portion 9 and also prevented from coming off in the axial direction by the retainer 32.

In the above description, the side plate and the retainer 32 are arranged on the axial end face of the outer race 1 on the opposite side of a side surface of the accordion spring 5 where a tab portion 25 is provided.

In this embodiment, the accordion spring is used as the spring, but a coil spring or the like can be likewise used.

INDUSTRIAL APPLICABILITY

The present invention is used as a component for torque transmission or backstop in a drive apparatus of, e.g., an automobile or industrial machinery, and its effect becomes particularly significant when it is used in a two-wheel vehicle.

This application claims the priority to the Japanese patent Application No. 2012-257235, filed on Nov. 26, 2012, which is hereby incorporated by reference as a part of this application.

The invention claimed is:

1. A roller type one-way clutch comprising:
an outer race having pockets that have a cam surface formed on an inner surface thereof;
an inner race that is concentric with the outer race and that is spaced from the outer race in a radial direction of the clutch to allow relative rotation of the races, and that has an annular outer peripheral raceway surface;
a plurality of rollers each of which is arranged in a corresponding pocket, engaged with the cam surface, and transmits torque between the outer race and the inner race; and
springs each of which is arranged in a corresponding pocket and energizes a corresponding roller by one end portion thereof in an engaging direction with respect to the cam surface,
wherein the other end portion of each spring is fixed to the outer race, and has, as an integral part of the other end portion of the spring, a support portion that supports an adjacent roller in said radial direction and that is constructed so that a single support portion for each roller is sufficient to prevent the roller from coming off of its pocket in the radial direction.

2. The roller type one-way clutch according to claim 1, wherein a tab portion that supports each roller in an axial direction is provided at the one end portion of the spring.

3. The roller type one-way clutch according to claim 1, wherein the spring is an accordion spring.

4. The roller type one-way clutch according to claim 1, wherein the other end portion of the spring is secured to the outer race by welding.

5. The roller type one-way clutch according to claim 4, wherein the other end portion of the spring is secured to the outer race by spot welding.

6. The roller type one-way clutch according to claim 1, wherein the other end portion of the spring is secured to the outer race by bonding.

7. The roller type one-way clutch according to claim 1, wherein the other end portion of the spring is secured to the outer race by soldering.

8. The roller type one-way clutch according to claim 1, wherein a notch is provided in a surface of the outer race to which the other end portion of the spring is fixed.

9. The roller type one-way clutch according to claim 1, wherein a retainer that prevents each roller from moving in the axial direction is provided on the outer race.

10. The roller type one-way clutch according to claim 1, wherein the one-way clutch comprises a side plate arranged in the axial direction, and the spring is fixed when the side plate holds the other end portion of the spring between itself and the outer race.

11. The roller type one-way clutch according to claim 1, wherein the support portion is rectangular.

12. The roller type one-way clutch according to claim 1, wherein the support portion is semicircular.

13. The roller type one-way clutch according to claim 1, wherein the support portion includes a plurality of segments.

* * * * *